United States Patent [19]

Golan et al.

[11] Patent Number: 4,470,640
[45] Date of Patent: Sep. 11, 1984

[54] CONTROL SYSTEM WITH SELECTIVE PRESSURE STAGING TO THE SPRING APPLIED, PRESSURE RELEASED BRAKE

[75] Inventors: Kenneth F. Golan, Pekin; Marvin L. Schneider, Peoria, both of Ill.

[73] Assignee: Caterpillar Tractor Co., Peoria, Ill.

[21] Appl. No.: 538,961

[22] PCT Filed: Sep. 11, 1981

[86] PCT No.: PCT/US81/01216

§ 371 Date: Sep. 11, 1981

§ 102(e) Date: Sep. 11, 1981

[87] PCT Pub. No.: WO83/00849

PCT Pub. Date: Mar. 17, 1983

[51] Int. Cl.³ .......................................... B60T 13/22
[52] U.S. Cl. ............................................ 303/2; 303/71
[58] Field of Search ....................... 303/2-4,
303/6 M, 9, 10-12, 13, 50-56, 71; 188/170;
192/4 R, 4 A, 91 R; 254/361; 91/446, 454, 448,
437, 439, 441, 438; 60/413, 384, 420, 450;
180/139, 132, 134

[56] References Cited

U.S. PATENT DOCUMENTS

| 3,326,317 | 6/1967 | Marquardt | 180/79.2 |
| 3,608,435 | 9/1971 | Conabee et al. | 91/454 |
| 3,957,315 | 5/1976 | Cummins et al. | 303/71 X |
| 4,253,540 | 3/1981 | Berg | 180/139 |
| 4,278,155 | 7/1981 | Golan et al. | 192/4 R |
| 4,320,691 | 3/1982 | McWilliams | 91/437 |

*Primary Examiner*—Douglas C. Butler
*Attorney, Agent, or Firm*—J. W. Burrows

[57] ABSTRACT

A control system (10) for a spring applied, pressure released brake (16) is provided to control the pressure level in the brake (16) in response to operation of a control valve (22) to stage the pressure levels relative to the operating mode of the control valve. The control system (10) also provides two different fluid pathways (58,60) that are individually operational to lubricate a winch and draw-works mechanism (18) in response to the operating position of the control valve (22). This system improves the response time needed to gradually release the brake (18).

9 Claims, 1 Drawing Figure

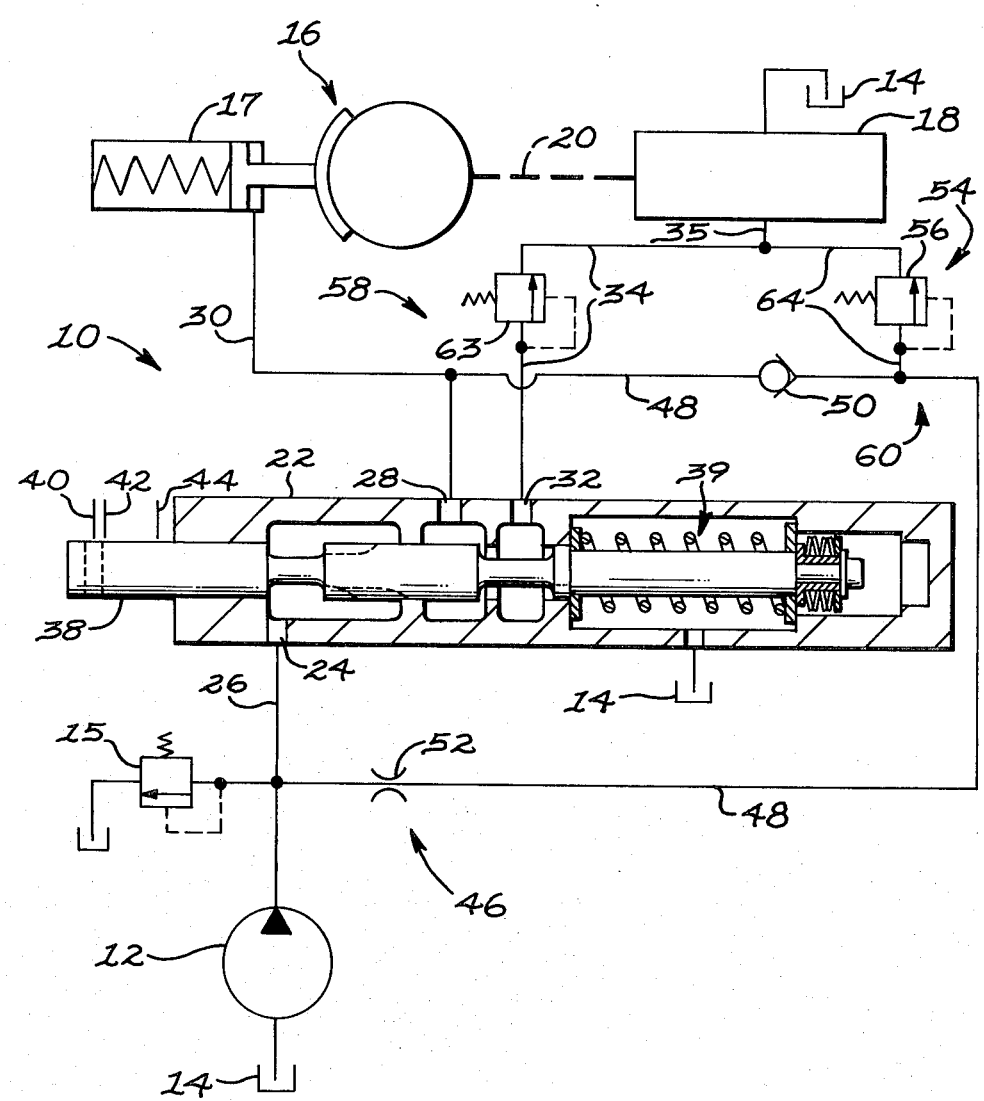

CONTROL SYSTEM WITH SELECTIVE PRESSURE STAGING TO THE SPRING APPLIED, PRESSURE RELEASED BRAKE

DESCRIPTION

TECHNICAL FIELD

This invention is directed to a control system for a spring applied, pressure released brake for use in a winch and draw-works mechanism such as that used on a pipelayer and more particularly to a control system for selectively staging the pressure to the brake and improving response time.

BACKGROUND ART

In a control system for a brake release on a winch, there are times at which the control valve and associated lines may leak fluid due to their attitude on the vehicle and allow air to fill the void. Upon actuation of the control valve to a metering position, a long pause time results because the oil is being used to fill the lines before the pressure level can be raised to release the brake.

Some types of hydraulic systems use a pressure relief valve or a flow restricting valve in a tank line to provide a back pressure, while others use a source of fluid to provide pressurized fluid to a control line in the system. However, none of these teach using a selective staging of the pressure levels in another source in response to positioning of the main control valve to control the pressure being supplied to the control line, such as, a brake release mechanism. The present invention is directed to overcoming one or more of the problems as set forth above.

DISCLOSURE OF THE INVENTION

In one aspect of the invention, a control system has a spring applied, pressure released brake connected to a first source of pressurized fluid by a control valve. The control valve has an inlet port connected to the source, an outlet port connected to the spring applied, pressure released brake, an exhaust port and a spool movable between a first, intermediate and second positions. At the first position of the spool, the inlet port is blocked from the outlet port and the outlet port is in fluid communication with the exhaust port. At the intermediate position, the inlet port is blocked from the outlet port and the outlet port is blocked from the exhaust port. At the second position, the inlet port is in fluid communication with the outlet port and the outlet port is blocked from the exhaust port. A second source of pressurized fluid is connected to the brake and has a one-way check valve positioned between the second source and the brake and adapted to pass fluid to the brake from the second source and prevent reverse flow. A means establishes a predetermined pressure level in the second source and the brake in response to the spool being moved to the intermediate position.

BRIEF DESCRIPTION OF THE DRAWING

The FIGURE is a partial schematic and diagrammatic representation of an embodiment of the present invention.

BEST MODE FOR CARRYING OUT THE INVENTION

Referring now to the FIGURE, a control system is generally indicated by reference numeral 10 and includes a first source of pressurized fluid, such as, a pump 12 drawing fluid from a tank 14, a relief valve 15 and a spring applied, pressure released brake 16 in fluid connection with the pump 12. The brake 16 has a brake actuator 17 to apply and release the brake 16. The brake 16 is coupled to a winch and draw-works mechanism 18 by a connection 20. A control valve 22 is positioned between the pump 12 and the brake actuator 17 to selectively control applying and releasing of the brake 16.

The control valve 22 has an inlet port 24 connected to the pump 12 by a conduit 26, an outlet port 28 connected to the brake actuator 17 of brake 16 by a conduit 30 and an exhaust port 32 connected to the winch and draw-works mechanism 18 through conduits 34,35. The control valve 22 has a spool 38 movable between a first, intermediate and second positions 40,42,44 and is spring biased to the first position by spring mechanism 39. At the first position 40, as shown, the inlet port 24 is blocked from the outlet port 28 and the outlet port 28 is in fluid communication with the exhaust port 32. At the intermediate position 42, the inlet port 24 is blocked from the outlet port 28 and the outlet port 28 is blocked from the exhaust port 32. At the second position 44, the inlet port 24 is in fluid communication with the outlet port 28 and the outlet port 28 is blocked from the exhaust port 32.

A second source 46 of fluid is connected to the brake actuator 17 through a conduit 48, a one-way check valve 50 and the conduit 30. The one-way check valve 50 is adapted to pass fluid to the brake from the second source and prevent reverse flow in the conduit 48. The second source 46 of fluid includes the conduit 48 connected to the source 12 and a control orifice 52 located in the conduit 48. A means 54 is provided for establishing a predetermined pressure level in the second source 46 of fluid and the brake 16 in response to the spool 38 being moved to the intermediate position 42. The means 54 includes a first relief valve 56 connected to the conduit 48 between the control orifice 52 and the one-way check valve 50. The first relief valve 56 is adapted to control the maximum pressure level of the second source 46 and hence the pressure in brake actuator 17 at the intermediate position 42 of the valve spool 38.

The winch and draw-works mechanism 18 is of the conventional design having a winch and gearing mechanism for driving the winch and is adapted to receive fluid from the exhaust port 32 of control valve 22 and the relief valve 56 for lubrication of the gears and bearings of the draw-works mechanism. The winch and draw-works mechanism 18 receives fluid through a first fluid pathway 58 in response to the control valve being in the first position 40 and through a second fluid pathway 60 in response to the control valve being in the intermediate position 42. The first fluid pathway 58 includes the conduit 48, the one-way check valve 50, the conduit 30, the outlet and exhaust ports 28,32, conduits 34,35, and a second relief valve 63 positioned in conduit 34. The second relief valve 63 is adapted to control the pressures in the first fluid pathway upstream of the relief valve 63 at a level less than the pressure in the second fluid pathway. The second fluid pathway includes the conduit 48, a conduit 64, the relief valve 56 and the conduit 35.

INDUSTRIAL APPLICABILITY

The present invention has particular utility in control systems that require quick response without having to rely on separate systems and additional controls.

During operation of the system, the pump 12 delivers fluid to the inlet port 24 of control valve 22 and is limited to a maximum predetermined pressure as established by the system relief valve 15. With the spool 38 in the first position 40, the fluid at the inlet 24 is blocked. Simultaneously therewith fluid passes through the control orifice 52, the conduit 48, the one-way check valve 50, and the conduit 30 to the outlet port 28 of the control valve 22 and to the brake actuator 17 of brake 16. With the spool 38 in the first position 40 the fluid flow is allowed to pass from the outlet port 28 to the exhaust port 32 and through the conduit 34, the second relief valve 63, and the conduit 35 to the winch and draw-works mechanism 18 for lubrication of the draw-works mechanism and subsequently passing the fluid to the tank 14. The second relief valve 63 is set at a level sufficient to maintain the pressure in the system at a predetermined minimum level. Upon actuation of the spool 38 to its intermediate position 42, the fluid to the inlet 24 is still blocked and the fluid to the outlet port 28 is now blocked from the exhaust port 32. Consequently, the fluid being delivered to the conduit 30 from the second source 46 will increase in pressure to the level as established by the relief valve 56. The relief valve 56 is set at a pressure level higher than the relief valve 63 but not sufficiently high enough to release the brake 16. The fluid from the conduit 48 passing through the relief valve 56 is directed to the winch and draw-works mechanism 18 through the conduits 64,35 for lubricating the draw-works portion and subsequently to tank 14. Upon movement of the control valve to the second position 44 the inlet port is controllably opened to the outlet port 28 to progressively increase the pressure in the brake actuator 17 to a pressure level sufficient to release the brake 16 for lowering a load that is supported by the winch. Since the pressure at the outlet port 28 is at a level just below that required for releasing the brake 16 the response time necessary for the brake 16 to release is considerably reduced. At the second position 44 of the spool 38 the fluid being supplied through the conduit 48 is still being passed through the relief valve 56 at a controlled rate as established by control orifice 52 to lubricate the draw-works portion of the winch and draw-works mechanism 18. The higher pressure in the line 30 is blocked from the relief valve 56 by the one-way check valve 50.

With the use of the staging of the pressures in the control system, the response time for operation of the brake release is substantially reduced. Consequently, the control spool 38 can be moved from the first position 40 toward the second position 44 to quickly increase the pressure in the brake actuator 17 to a level just short of brake relese and then gradually release the brake 16 as the spool 38 is moved to the position metering flow to the brake actuator 17.

Other aspects, objects and advantages of this invention can be obtained from a study of the drawing, disclosure, and appended claims.

We claim:

1. A control system (10) for a spring applied, pressure released brake (16), comprising:

a first source (12) of pressurized fluid;

a control valve (22) having an inlet port (24) connected to said source (12), an outlet port (28) connected to the spring applied, pressure released brake (16), an exhaust port (32), and a spool (38) movable between a first position (40) at which said inlet port (24) is blocked from said outlet port (28) and said outlet port (28) is in fluid communication with said exhaust port (32), an intermediate position (42) at which said inlet port (24) is blocked from said outlet port (28) and said outlet port (28) is blocked from said exhaust port (32), and a second position (44) at which said inlet port (24) is in fluid communication with said outlet port (28) and said outlet port (28) is blocked from said exhaust port (32);

a second source (46) of fluid connected to the brake (16);

a one-way check valve (50) positioned between the second source (46) of fluid and the brake (16) and adapted to pass fluid to the brake (16) from the second source (46) and to block reverse flow; and means (54) for establishing a maximum pressure level in the second source (46) of fluid and the brake (16) in response to the spool (38) being moved to the intermediate position (42).

2. The control system (10), as set forth in claim 1, wherein the second source (46) of fluid includes a conduit (48) connected to said first source (12) and a control orifice (52) located in the conduit, the means (54) for establishing a maximum pressure level includes a first relief valve (56) connected to said conduit (48) between said control orifice (52) and said one-way check valve (50), said first relief valve (56) being adapted to control the maximum pressure level of the second source (46) at the intermediate position (42) of the valve spool (38).

3. The control system (10), as set forth in claim 2, including a second relief valve (63) connected to said exhaust port (32) of the control valve (22) and adapted to maintain a predetermined pressure level in the outlet and exhaust ports (28,32) in response to the spool (38) being at the first position (40), said predetermined pressure level being less than said maximum pressure level of the second source (46).

4. The control system (10), as set forth in claim 3, further including a draw-works mechanism (18) connected to the first and second relief valves (56,63) and adapted to receive fluid from said first and second relief valves (56,63) to lubricate the draw-works mechanism (18).

5. The control system (10), as set forth in claim 3, wherein the maximum pressure level is less than that required to release the brake (16).

6. The control system (10), as set forth in claim 5, wherein the pressure level in the brake (16) is at a level sufficient to release the brake (16) at the second position (44) of the spool (38) of the control valve (22).

7. A control and lubricating system (10) for a winch and draw-works mechanism (18) having a spring applied, pressure released brake (16), comprising:

a first source (12) of pressurized fluid;

a control valve (22) having an inlet port (24) connected to said source (12), an outlet port (28) connected to the spring applied, pressure released brake (16), an exhaust port (32) connected to the draw-works mechanism (18) and a spool (38) movable between a first position (40) at which said first source (12) is blocked from said outlet port (28) and said outlet port (28) is in fluid communication with said exhaust port (32) and a second position (44) at which said source (12) is in communication with said outlet port (28) and said outlet port (28) is blocked from said exhaust port (32);

a second source (46) of pressurized fluid connected to said outlet port (28) of the control valve (22) and including a one-way check valve (50) which passes fluid flow to the outlet port (28) and blocks reverse fluid flow;

a relief valve (56) connected between the second source (46) and the one-way check valve (50) and adapted to establish a maximum pressure level of said second source (46);

a first fluid pathway (58) communicating fluid from the second source (46) to the draw-works mechanism (18) in response to the spool (38) of the control valve (22) being in the first position (40); and a second fluid pathway (60) communicating fluid from the second source (46) to the draw-works mechanism (18) in response to the spool (38) of the control valve (22) being in the second position (44).

8. The control and lubricating system (10), as set forth in claim 7, including a second relief valve (63) located in the first fluid pathway (58) between the exhaust port (32) of the control valve (22) and the draw-works mechanism (18), said second relief valve (63) adapted to establish a fluid pressure level upstream of the relief valve (63) less than the pressure level of the first relief valve (56).

9. The control and lubricating system (10), as set forth in claim 7, wherein said second source of pressurized fluid includes a cnduit (48) connected to said first source (12) and a control orifice (52) located in the conduit (48).

* * * * *